US012753701B2

(12) United States Patent
Cousseau

(10) Patent No.: US 12,753,701 B2
(45) Date of Patent: Oct. 6, 2026

(54) DEVICE FOR AXIALLY RETAINING MOVING BLADES OF AN LP TURBINE IN THE SLOTS OF A ROTOR DISC OF THE LP TURBINE AND METHOD FOR ASSEMBLING SAID MOVING BLADES

(71) Applicant: SAFRAN AIRCRAFT ENGINES, Paris (FR)

(72) Inventor: Simon Jean-Marie Bernard Cousseau, Moissy Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/873,586

(22) PCT Filed: May 29, 2023

(86) PCT No.: PCT/FR2023/050746
§ 371 (c)(1),
(2) Date: Dec. 10, 2024

(87) PCT Pub. No.: WO2023/242490
PCT Pub. Date: Dec. 21, 2023

(65) Prior Publication Data
US 2025/0341167 A1 Nov. 6, 2025

(30) Foreign Application Priority Data
Jun. 13, 2022 (FR) ...................................... 2205682

(51) Int. Cl.
*F01D 5/30* (2006.01)
*F01D 5/32* (2006.01)

(52) U.S. Cl.
CPC .......... *F01D 5/3015* (2013.01); *F01D 5/323* (2013.01); *F05D 2300/6033* (2013.01)

(58) Field of Classification Search
CPC .......... F01D 5/282; F01D 5/30; F01D 5/3007; F01D 5/3015; F01D 5/3084; F01D 5/32; F01D 5/323; F05D 2300/6033
See application file for complete search history.

(56) References Cited

U.S. PATENT DOCUMENTS 3,216,699 A * 11/1965 Schoenborn .............. F01D 5/22 416/190
3,378,230 A * 4/1968 Toomey .................. F01D 5/323 416/221
(Continued)

FOREIGN PATENT DOCUMENTS

EP 2 042 689 B1 11/2010
EP 3 153 667 B1 5/2019
JP H02-199201 A 8/1990

OTHER PUBLICATIONS

International Search Report as issued in International Patent Application No. PCT/FR2023/050746, dated Sep. 13, 2023.

*Primary Examiner* — Elton K Wong
(74) *Attorney, Agent, or Firm* — CUSHMAN PARTNERS, LLC

(57) ABSTRACT

A device for axially retaining a moving blade of a low-pressure turbine in a recess of a rotor disc of axis of the turbine. This device includes a stop part intended to extend between an upstream face of a blade root of the moving blade and a downstream face of the root of the moving blade, the stop part including a first wall which forms an end stop for the upstream face of the blade root, a second wall which forms an end stop for the downstream face of the blade root, and a connection surface intended to extend between the first and the second wall along a radially inner end face of the blade root.

10 Claims, 5 Drawing Sheets

(56) References Cited

U.S. PATENT DOCUMENTS

| | | | | | |
|---|---|---|---|---|---|
| 3,653,781 | A * | 4/1972 | Cooper | F01D 5/323 | 416/221 |
| 6,109,877 | A * | 8/2000 | Gekht | F01D 5/323 | 416/207 |
| 2009/0060746 | A1 * | 3/2009 | Barr, Jr. | F01D 5/323 | 416/221 |

* cited by examiner

[Fig. 1]
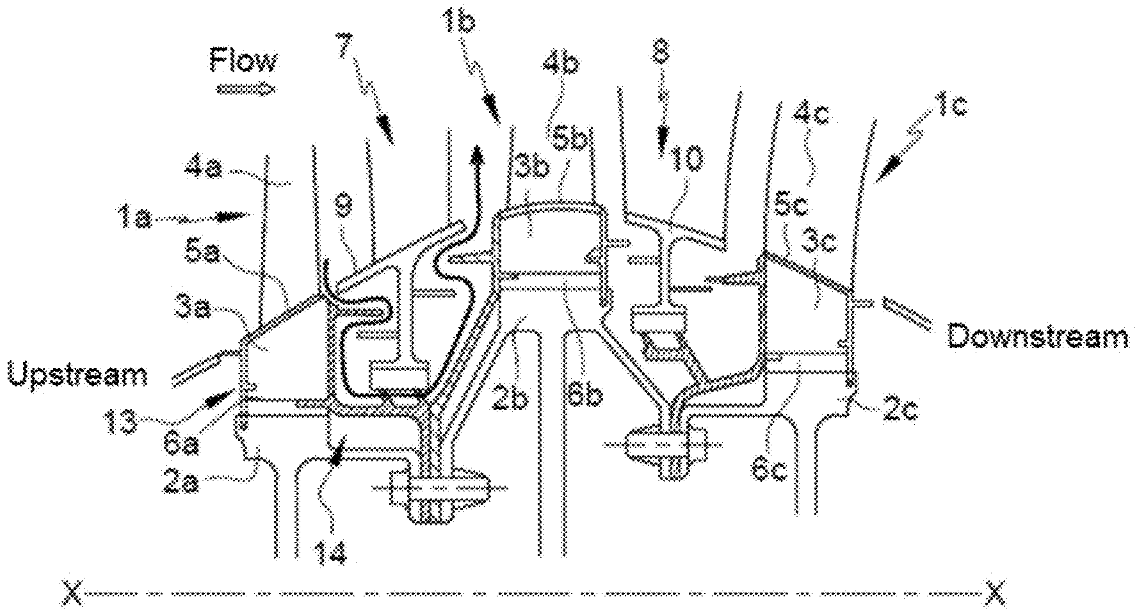
[Fig. 2]
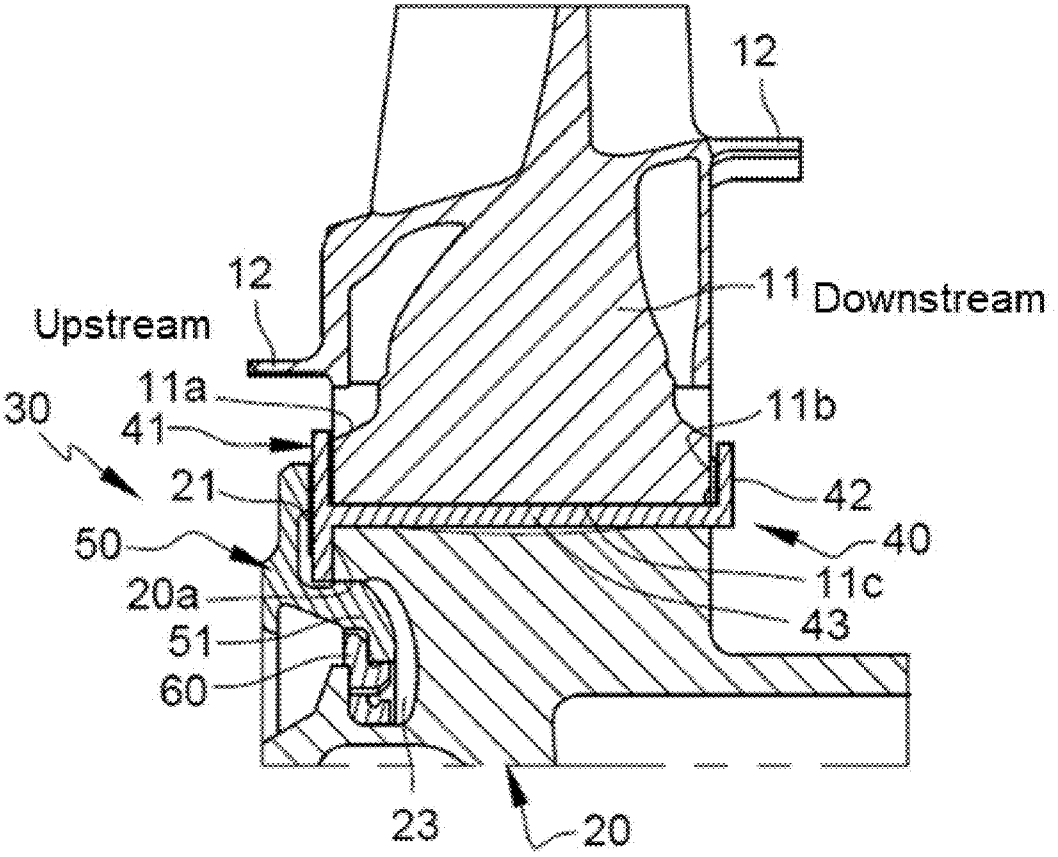

[Fig. 3]
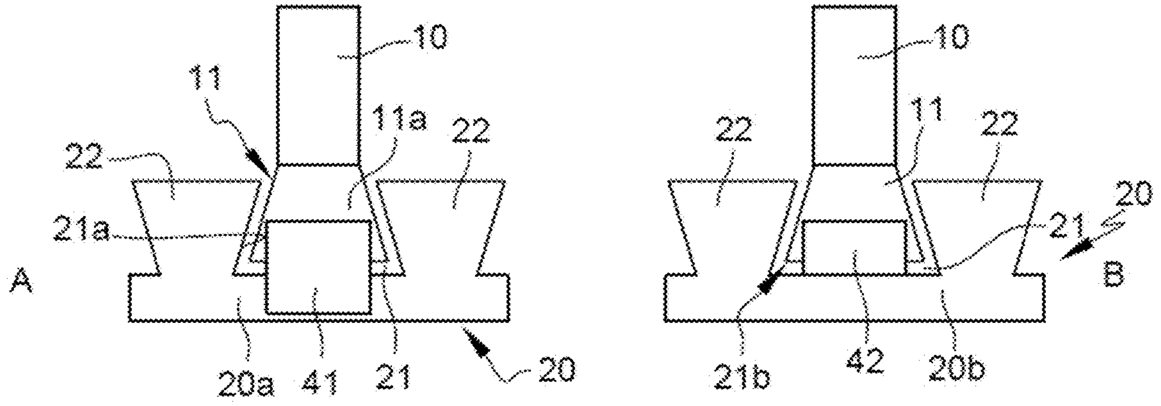
[Fig. 4]
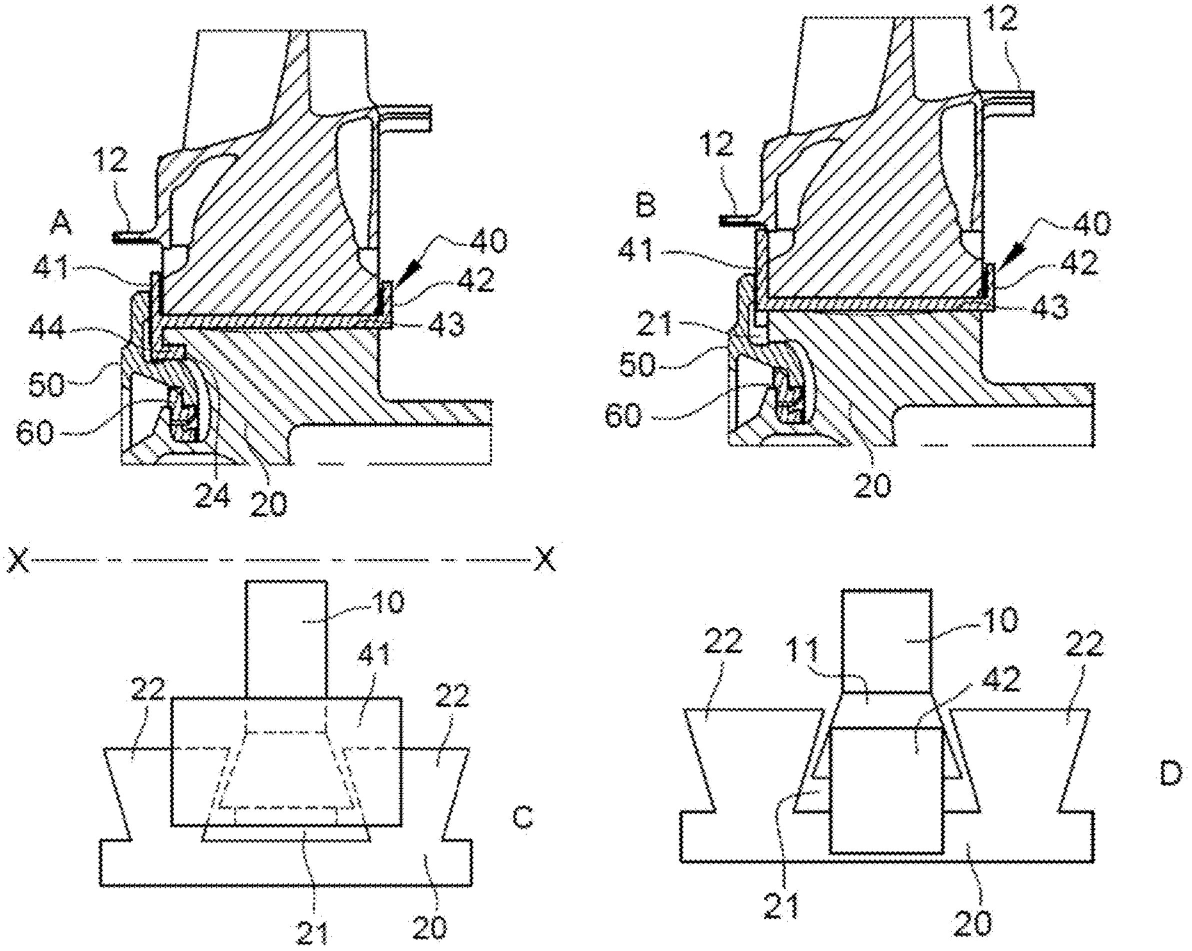

[Fig. 5A]
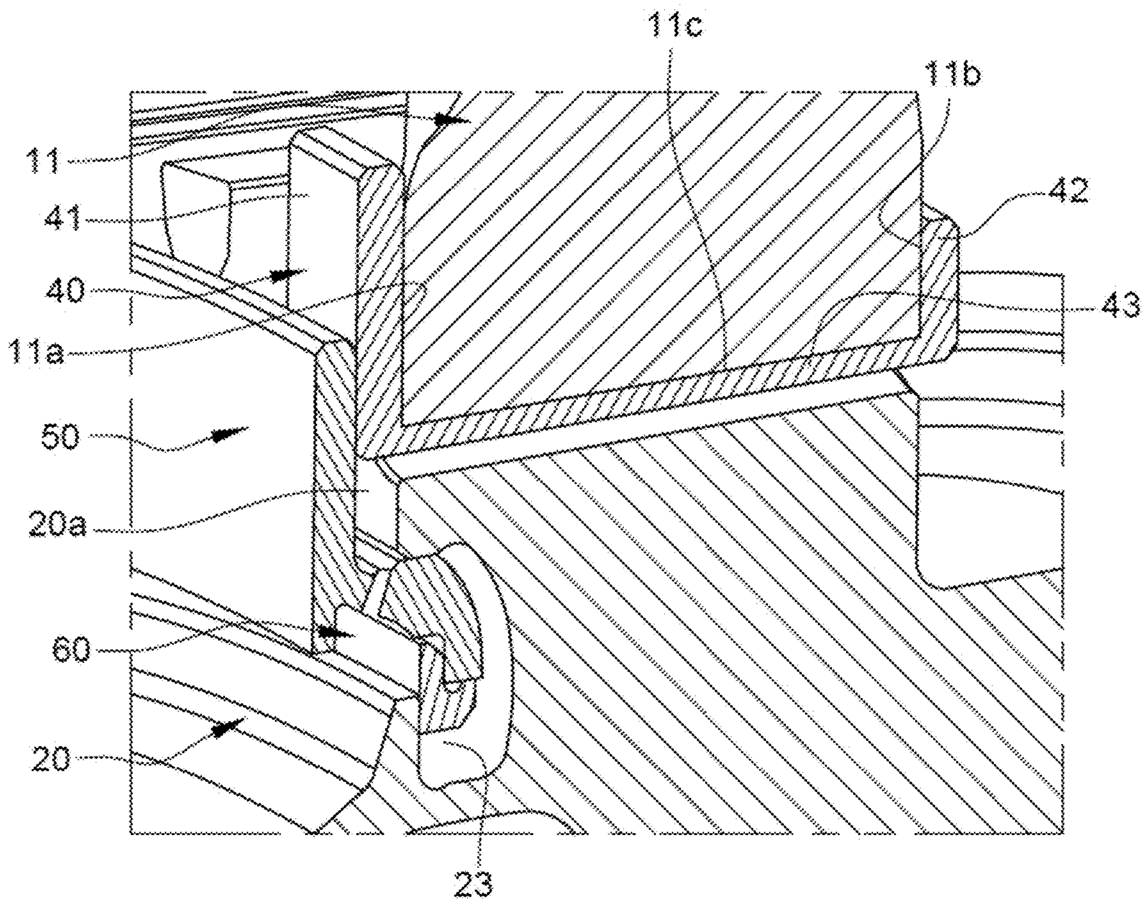
[Fig. 5B]
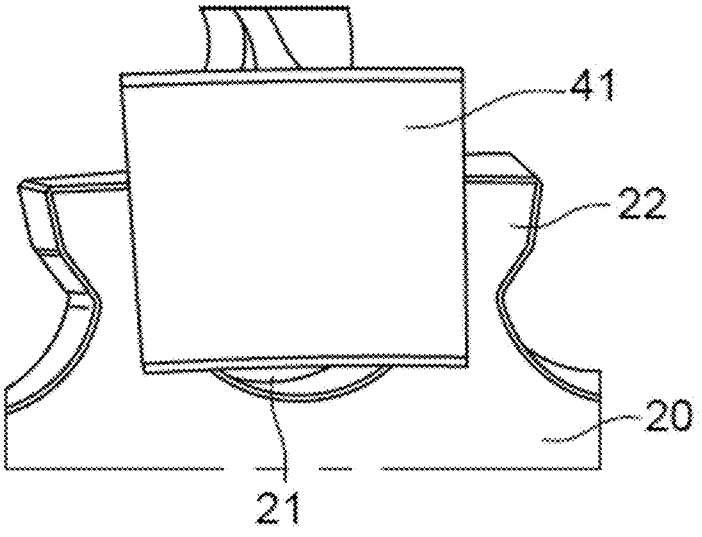

[Fig. 5C]
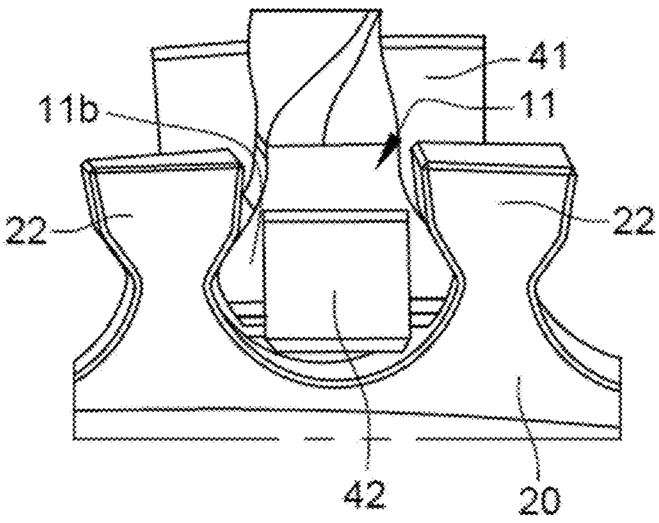
[Fig. 6]
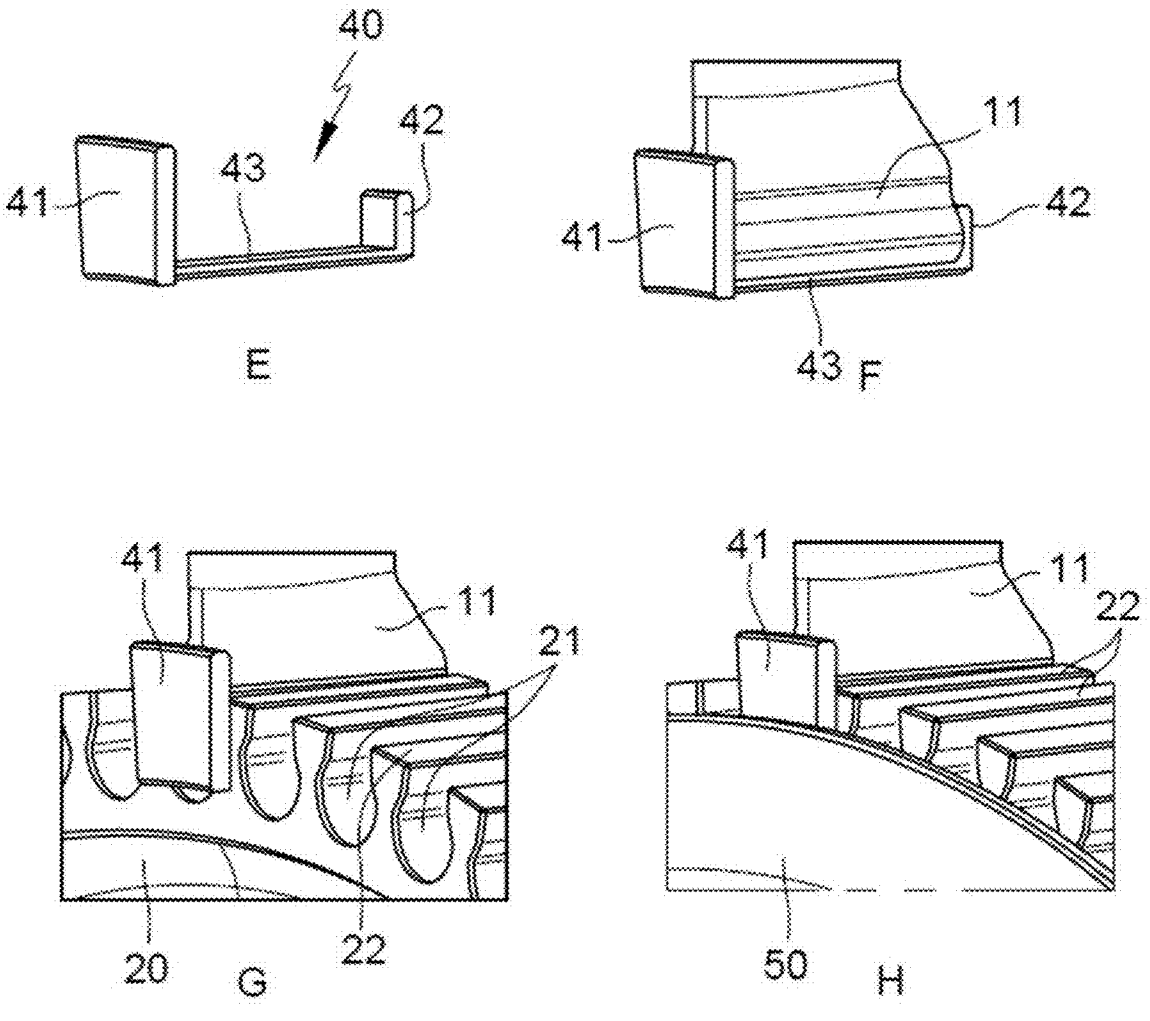

[Fig. 7]
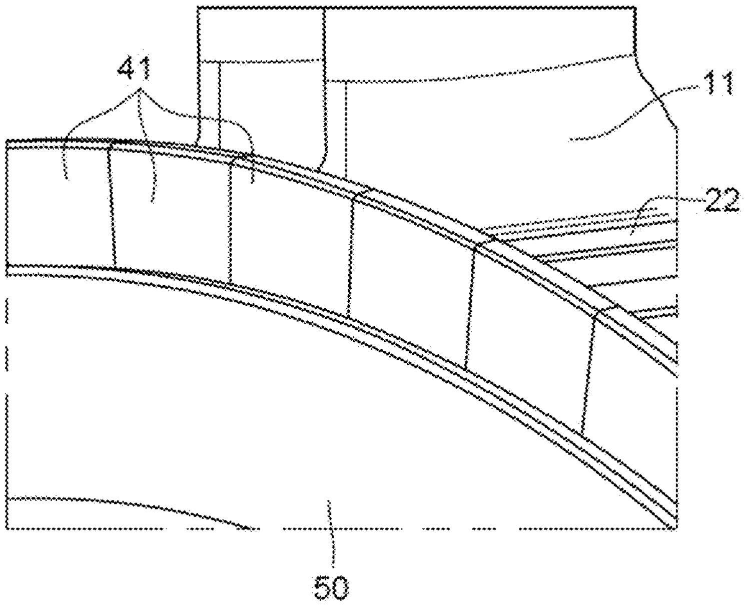

DEVICE FOR AXIALLY RETAINING MOVING BLADES OF AN LP TURBINE IN THE SLOTS OF A ROTOR DISC OF THE LP TURBINE AND METHOD FOR ASSEMBLING SAID MOVING BLADES

CROSS-REFERENCE TO RELATED APPLICATIONS

This application is the U.S. National Stage of PCT/FR2023/050746, filed May 29, 2023 which in turn claims priority to French patent application number 2205682 filed Jun. 13, 2022. The content of these applications are incorporated herein by reference in their entireties.

TECHNICAL FIELD OF THE INVENTION

This invention relates to a device for axially retaining the moving blades of a low pressure (LP) turbine in slots of the LP turbine rotor disc. It also relates to a method for mounting these moving blades into the rotor disc.

The invention finds applications in the field of aeronautics and, in particular, in the field of low pressure turbines for aircraft turbomachines.

TECHNOLOGICAL BACKGROUND OF THE INVENTION

In a known manner, a low pressure (LP) turbine comprises several successive blade wheels, separated by distributor stages. A blade wheel, also referred to as a wheel, comprises so-called "moving" blades and a rotor disc. The outer periphery of the rotor disc includes mounting grooves, referred to as slots, which extend along substantially axial directions (i.e. at an angle of up to a few degrees relative to the axial direction). Each slot is designed so as to receive the root of a moving blade press fitted into said slot.

Usually, a first axial retaining ring, or flange, arranged on the upstream face of the turbine disc and a second axial retaining ring, arranged on the downstream face of the turbine disc, are provided. These rings form axial stops for the blade roots housed in the slots. An example of a BP turbine portion including three blade wheels 1*a*, 1*b*, 1*c* according to the state of the art is represented in FIG. 1. The blade wheels 1*a*, 1*b*, 1*c* are separated from each other by distributors 7, 8, each equipped with a shroud 9, 10 forming the inner wall of the stream of flow F. Each blade wheel 1*a*, 1*b*, 1*c* comprises a disc rotating about the central axis of the turbine, depicted by axis X, and including an external peripheral rim 2*a*, 2*b*, 2*c*, to which the blades are attached by their root 3*a*, 3*b*, 3*c*. In particular, a first wheel 1*a* includes a mobile blade 4*a* axially mounted, by its root 3*a*, into a slot 6*a* of the rim 2*a* of the disc. The root 3*a* of the blade 4*a* is axially blocked, upstream, by an annular flange 13 and, downstream, by an annular flange 14, the flanges 13 and 14 being of different types.

These flanges and/or circlips, which enable the roots 3*a*, 3*b*, 3*c* of the blades 4*a*, 4*b*, 4*c* to be axially held, should be held along said blades. In some cases, axial holding of the flange or circlip is ensured by a butt hook, or hook, the shape of which is relatively complex. In other cases, axial holding is achieved by means of an engaged lock.

Nowadays, moving blades are often made from a ceramic matrix composite (CMC) material, which has the advantage of being lightweight. CMC blades are therefore lighter than conventional metal blades. However, the manufacture of CMC blades with a hook is complex because it involves weaving and requires two layers of texture to be formed on the blade, at the platform 5*a*, 5*b*, 5*c* located between the vane and the root 3*a*, 3*b*, 3*c* of the blade, one of which forms the surface delimiting the air stream and the hook and the other of which serves to prevent the blade from tilting and to cover it downstream. In addition, taking up the centrifugal force transfer from an axial flange or circlip to a hook integrated into the blade leads to centrifugal mechanical loading, which is detrimental to the hook made of CMC material.

In the case of an engaged lock, the blade wheel seal has to be advanced to the root of the low pressure distributors (LPDs), which means there is not enough space to integrate axial stop solutions at the back of the blades, i.e. on the downstream face of the blade roots.

There is therefore a real need for a device for axially retaining the blade roots in the disc slots that does not require the manufacture of a CMC hook or the seal advancement at the DBP root.

SUMMARY OF THE INVENTION

In response to the problems discussed above of axially holding the root of the moving blade in the disc slot, the applicant provides a stop piece positioned between the root of the blade and the bottom of the disc slot and extending between the upstream face and the downstream face of the blade root.

In the following description, the terms "upstream" and "downstream" are defined relative to the air flow direction from the air inlet to the LP turbine to the air outlet from the LP turbine. In other words, upstream and downstream are understood along a central axis X with respect to the general direction of the operating gases.

In the description, the term "external" designates surfaces or parts of pieces furthest from the central axis X of the turbomachine air stream (i.e. the axis of rotation of the fan blades), as opposed to the term "internal" which designates the surfaces and parts of the pieces closest to said central axis X.

According to a first aspect, the invention relates to a device for axially retaining a low pressure turbine moving blade in a slot of a rotor disc with axis of said turbine, characterised in that it includes a stop piece to be extended between an upstream face of a blade root of the moving blade and a downstream face of said blade root of the moving blade, said stop piece including:

- a first wall which forms a stop for the upstream face of the blade root,
- a second wall which forms a stop for the downstream face of the blade root, and
- a connecting surface to be extended between the first and second walls, along a radially inner end face of the blade root.

This device enables the blade roots to be axially stopped or blocked in the disc slots without the need for any hook on the blade or any specific piece on the downstream face of the blade wheel. It thus avoids the need for an axial circlip whose centrifugal force would have to be transferred to a hook integrated into the CMC blade. Moreover, it has the advantage of being of reduced overall space, saving space downstream of the blade root so as to leave room for axial sealing.

Further to the characteristics just discussed in the preceding paragraph, the axial retaining device according to one aspect of the invention may have one or more additional characteristics from among the following, considered individually or according to any technically possible combinations:

- the stop piece is a one-piece metal piece.
- the first wall of the stop piece includes a width or height dimension which is greater than another width or height dimension of the second wall, the dimensions being taken in a plane transverse to the connecting surface.
- the first wall is configured to partly extend over an upstream face of the rotor disc.
- the first wall of the stop piece extends perpendicularly on either side of the connecting surface.
- the second wall of the stop piece extends perpendicularly to the connecting surface so that it can cover a downstream face of a blade root.

A second aspect of the invention relates to a turbomachine rotor assembly comprising a rotor disc with axis X which has slots hollowed out at its periphery and moving blades mounted into disc slots, two circumferentially adjacent slots around the disc each delimiting a tooth on the disc, characterised in that it includes:

- a plurality of stop pieces as defined above, each stop piece being for axially holding a moving blade in a corresponding slot in the disc, and,
- means for blocking the stop pieces against the disc, the first wall of each stop piece circumferentially extending so as to be in contact with at least one upstream face of a tooth of the rotor disc.

Advantageously, this assembly can have the following characteristics, considered individually or according to any technically possible combinations:

- the disc comprises a cavity hollowed out in the disc and in that the first wall comprises a hook interlock fitted into the cavity.
- it includes a plurality of stop pieces each arranged in a disc slot and configured so that their first walls are circumferentially arranged end to end, about axis X.
- it includes a retaining ring attached to the disc and mounted to the entire circumference of the rotor disc, against the first walls of the stop pieces so as to hold the stop pieces in position in the slots of the disc.
- it further includes a circlip housed in a groove of the rotor disc, at an inner end of the retaining ring, the circlip being configured to secure the retaining ring to the disc after the retaining ring has been mounted to the disc.

A third aspect of the invention relates to a method for mounting low pressure turbine moving blades into slots in a rotor disc of said turbine, characterised in that it includes, for each moving blade, the following steps of:

- installing a stop piece as defined previously against a radially inner end face of a blade root, and
- installing the moving blade equipped with the stop piece in a slot of the rotor disc.

This method has the advantage of being relatively simple to implement.

Advantageously, the method includes the following operations of:

- installing the circlip in a groove of the rotor disc, and
- installing a retaining ring on the disc along the first walls of the stop piece, the retaining ring being held in position by blocking made by the circlip.

BRIEF DESCRIPTION OF THE FIGURES

Further advantages and characteristics of the invention will become apparent upon reading the following description, illustrated by the figures in which:

FIG. 1, already described, represents a schematic view in a longitudinal cross-section view of part of a LP turbine with several blade wheels according to the state of the art;

FIG. 2 represents a longitudinal cross-section view of the axial retaining device according to the invention, with a stop piece mounted between a blade root and a disc slot;

FIG. 3 represents a schematic upstream view and a schematic downstream view of a stop piece of the axial retaining device according to the invention, mounted between a blade root and a disc slot;

FIG. 4 represents several cross-section views, from upstream to downstream, of various embodiments of the stop piece according to the invention;

FIGS. 5A, 5B and 5C represent, respectively, a cutaway perspective view, an upstream view and a downstream view of one embodiment of the axial retaining device according to the invention;

FIG. 6 represents, in perspective views, several steps of the method for mounting moving blades according to the invention; and FIG. 7 represents a perspective view of several moving blades mounted into a rotor disc with the axial retaining device according to the invention.

DETAILED DESCRIPTION

An exemplary embodiment of an axial retaining device for LP turbine blades is described in detail hereinafter, with reference to the appended drawings. This example illustrates the characteristics and advantages of the invention. However, it is reminded that the invention is not limited to this example.

In the figures, identical elements are identified by identical references. For reasons of legibility, the size scales between the elements represented are not respected.

One example of an axial retaining device according to the invention is represented in a cross-section view in FIG. 2. This axial retaining device 30 includes, for each moving blade 10, a stop piece 40 configured to be housed between the root 11 of the blade 10 and the slot 21 of the disc 20 of the turbine rotor BP. This stop piece 40 extends between the upstream face 11*a* of the blade root 11 and the downstream face 11*b* of this blade root. For this, the stop piece 40 includes:

- a first wall 41, also referred to as the upstream wall, configured to be positioned at least partially along the upstream face 11*a* of the blade root,
- a second wall 42, also referred to as the downstream wall, configured to be positioned at least partially along the downstream face 11*b* of the blade root, and
- a connecting surface 43 axially (i.e. along the central axis (X)) connecting the upstream wall 41 and the downstream wall 42, along the inner face 11*c* of the blade root.

The upstream and downstream walls of the stop piece 40 can, for example, be made of metal or an alloy, such as one of superalloys conventionally used in this zone of the turbine. The upstream wall 41 and downstream wall 42 are, for example, square or rectangular shaped. The connecting surface 43 can be a plate, preferably of the same metal or alloy as the upstream and downstream walls. The connecting surface 43 is preferably rectangular in shape, with an axial dimension substantially greater than the axial dimension of the blade root 11. The upstream and downstream walls 41 and 42 as well as the connecting surface 43 can be made in a single piece so that the stop piece 40 is one-piece.

According to some embodiments, the upstream wall 41 and the downstream wall 42 of the stop piece have similar dimensions. According to other embodiments, the upstream wall 41 and the downstream wall 42 have different dimensions, with the upstream wall 41 having larger dimensions than the downstream wall 42. Indeed, as represented in the example of FIGS. 2 and 3, the upstream wall 41 can extend radially (i.e. along an axis perpendicular to axis X) in front of the upstream face 11*a* of the blade root and in front of the part of the upstream face of the disc 20 below the slot. The upstream wall 41 can thus extend in parallel to the upstream opening 21*a* of the slot 21 and to the inner part of the upstream face of the disc 20 (the inner part being the part of the disc devoid of inter-slot teeth 22). In this example, the downstream wall 42 extends radially in front of the downstream opening 21*b* of the slot 21, i.e. along the downstream face 11*b* of the blade root. In the example shown in FIGS. 2 and 3, the stop piece 40 thus has an inverted T-shaped cross-section, with an upstream wall 41 extending radially on either side of the connecting surface 43 and a downstream wall 42 extending radially in the direction of the platform 12 of the blade 10. With such a configuration, the upstream wall 41 is blocked, upstream, by the disc 20 so that the entire stop 40 is axially blocked upstream.

The axial retaining device 30 of the invention may include, in addition to the stop piece 40, a flange 50, or retaining ring, radially mounted along the upstream face 20*a* of the disc 20. This flange 50, which is annular in shape, extends in parallel to the slots 21 and the inter-slot teeth 22 of the disc 20 over the entire circumferential length of the disc. This flange 50, conventionally shaped for a LP turbine flange, includes a hook 51 partially housed in a groove 23 of the disc 20. This hook 51 ensures that the flange 50 is hooked onto the disc 20. Thus mounted along the disc 20, the flange 50 extends upstream of the upstream wall 41 of the stop piece 40 so as to prevent any axial movement of the stop piece 40 from downstream to upstream.

It is therefore understood that the stop piece 40 is axially blocked in both directions, i.e. from upstream to downstream and from downstream to upstream. Thus, the blade root 11 positioned inside the stop piece 40 is itself axially blocked in both directions.

According to some embodiments, the axial retaining device 30 also includes an axial circlip 60 housed in the groove 23 of the disc 20. This axial circlip 60 is a substantially annular piece made of a flexible, substantially elastic, material, such as superalloys conventionally used in turbines. The axial circlip 60 includes a radial slot extending over the entire cross-section of said circlip. This radial slot enables it to be lowered into the groove 23 to insert (or remove) the flange 50.

FIG. 4 represents embodiments in which the stop 40 has different shapes. Drawing A in FIG. 4 shows, in a cross-section view, one example of a stop piece 40 including an upstream wall 41 equipped with a shoulder 44 inserting into the disc 20. This shoulder 44, also referred to as a hook, is formed as an axial extension extending from the upstream wall 41 at a substantially right angle. This axial extension is designed to be inserted into an adapted housing 24 located at the inlet of the groove 23 of the disc 20. In a cross-section view, shoulder 44 is hook-shaped, with a portion housed in disc 20. In other words, the shoulder 44 is inserted into the disc, under the slot 21 receiving the stop piece 40, partially interlock fitting the inner periphery of the slot 21 of the disc 20, so that the centrifugal force of the stop piece 40 is transferred to the disc and the blade 10 is partially relieved of this force.

Drawing B and drawing C of FIG. 4 respectively show a cross-section view and a schematic upstream view, an example of a stop piece 40 in which the upstream wall 41 radially extends up to the platform 12 of the blade 10 so as to create partial seal for the slots 21. In this embodiment, the stop 40 has a substantially U-shaped cross-section, with an upstream wall 41 extending in a single radial direction from the connecting surface 43; the upstream wall 41 extends further radially than the downstream wall 42, up to the blade platform 12. In this embodiment, axial blocking or stopping in the downstream direction is achieved by blocking the upstream wall 41 against the teeth 22 of the disc 20.

Drawing D in FIG. 4 shows, in a schematic downstream view, one example of the stop piece 40 in which the downstream wall 42 radially extends on either side of the connecting surface 43. In this embodiment, the downstream wall 42 extends not only in front of the upstream face 11*a* of the blade root, but also in front of the upstream face of the disc 20 under the slot 21. The downstream wall 42 thereby participates in axially blocking the stop piece 40 in an upstream direction.

Of course, the various exemplary embodiments described above may be combined with one another, such as, for example, the upstream wall 41 of drawing C combined with the downstream wall 42 of drawing D, or the upstream wall with shoulder 44 of drawing A combined with the downstream wall 42 of drawing D, etc.

The embodiment of drawing B in FIG. 4 is represented, in a cutaway perspective view, in FIG. 5A, in an upstream view (or front view) in FIG. 5B and in a downstream view (or rear view) in FIG. 5C. These views show a stop piece 40 with a substantially U-shaped cross-section, mounted into a slot 21 of the disc 20, under the blade root 11 so as to cover the upstream face 11*a* of the blade root 11, the downstream face 11*b* of the blade root and the inner face 11*c* of said blade root. FIG. 5A also shows the groove 23 in the disc 20 in which the circlip 60 and the flange 50 are housed, said circlip 60 being positioned at the inner end of the flange 50.

Whatever the shape and dimensions of the upstream and downstream walls of the stop piece 40, the axial retaining device 30 is mounted as indicated in FIG. 6. The mounting method according to the invention includes the following steps, represented by drawings E to H:

- Drawings E: manufacturing the stop piece 40 with its upstream wall 41 and its downstream wall 42 connected by the connecting surface 43;
- Drawings F: installing the stop piece 40 under the blade root 11, i.e. against the inner face 11*c* of the blade root 11 of the blade 10;
- Drawing G: installing the moving blade 10 equipped with the stop piece 40 into a slot 21 in the disc 20, the upstream wall 41 of the stop piece being in contact with the teeth 22 located on either side of the slot 21; and
- Drawings H (for the embodiments concerned and after all the blades have been mounted): installing the flange 50 into the groove 23 of the disc 20, along the upstream wall 41, the flange 50 being installed after the circlip 60 has been positioned in the groove 23.

Once all the moving blades 10, each equipped with a stop piece 40, have been mounted in the slots 21 of the disc 20, the upstream walls 41 of all the stop pieces 40 are positioned side by side, circumferentially, one after the other. One example of several juxtaposed upstream walls 41 is represented in FIG. 7. Although, for the sake of clarity, only two blade roots 11 have been represented in this FIG. 7, several upstream walls 41 are represented side by side, each forming part of one of the stop pieces 40 housed in the slots 21 of the disc 20. FIG. 7 also shows the flange 50 mounted along the upstream walls 41 and forming an axial retainer (from downstream to upstream) for the stop pieces 40 and, consequently, the blade roots 11. The flange 50 not only ensures axial stop for the blade roots 11, via the stop pieces 40, but also ventilation of the slots 21 of the disc. Indeed, ventilation of the slots 21 of the disc 20 is necessary during operation of the turbomachine in view of the high temperature of gases circulating in the flow stream of the LP turbine.

Although described through a number of examples, alternatives and embodiments, the axial retaining device according to the invention comprises various alternatives, modifications and improvements which will be obvious to the person skilled in the art, it being understood that these alternatives, modifications and improvements are within the scope of the invention.

The invention claimed is:

1. A turbomachine rotor assembly comprising a rotor disc to rotate about an axis, the rotor disc having slots hollowed out at its periphery and moving blades mounted into the slots of the disc, two circumferentially adjacent slots around the disc each delimiting a tooth of the disc, and a plurality of stop pieces to be extended between an upstream face of a blade root of the moving blade and a downstream face of said blade root of the moving blade, said stop pieces including:

a first wall which forms a stop for the upstream face of the blade root, a second wall which forms a stop for the downstream face of the blade root, and a connecting surface to be extended between the first and second walls along a radially inner end face of the blade root, each stop piece being for axially holding a moving blade in a corresponding slot of the disc, and, an annular piece for blocking the stop pieces against the disc, the first wall of each stop piece circumferentially extending so as to be in contact with at least one upstream face of a tooth of the rotor disc, a plurality of stop pieces each disposed in a slot of the disc and configured so that their first walls are circumferentially arranged end to end, about said axis, and a retaining ring attached to the disc and mounted to the entire circumference of the rotor disc against the first walls of the stop pieces so as to hold the stop pieces in position in the disc slots.

2. The assembly according to claim 1, wherein each of the stop pieces is a one-piece metal piece.

3. The assembly according to claim 1, wherein the first wall of each of the stop pieces has a width or height dimension which is greater than another width or height dimension of the second wall, the dimensions being taken in a plane transverse to the connecting surface.

4. The assembly according to claim 1, wherein the first wall is configured to partly extend over an upstream face of the rotor disc.

5. The assembly according to claim 1, wherein the first wall of each of the stop pieces extends perpendicularly on either side of the connecting surface.

6. The assembly according to claim 1, wherein the second wall of each of the stop pieces extends perpendicularly to the connecting surface of said stop piece so as to be able to cover a downstream face of one of the blade roots.

7. The assembly according to claim 1, wherein the disc comprises a cavity hollowed out in the disc and wherein the first wall comprises a hook interlock fitted into the cavity.

8. The assembly according to claim 1, further includes a circlip housed in a groove of the rotor disc, at an inner end of the retaining ring, the circlip being configured to secure the retaining ring to the disc after the retaining ring has been mounted to the disc.

9. A method for mounting moving blades into slots of a rotor disc of a low pressure turbine of a turbomachine rotor assembly comprising the rotor disc to rotate about an axis, the rotor disc having slots hollowed out at its periphery and the moving blades mounted into the slots of the disc, two circumferentially adjacent slots around the disc each delimiting a tooth of the disc, and a plurality of stop pieces to be extended between an upstream face of a blade root of the moving blade and a downstream face of said blade root of the moving blade, said stop pieces including:

a first wall which forms a stop for the upstream face of the blade root, a second wall which forms a stop for the downstream face of the blade root, and a connecting surface to be extended between the first and second walls along a radially inner end face of the blade root, each stop piece being for axially holding a moving blade in a corresponding slot of the disc, and, an annular piece for blocking the stop pieces against the disc, the first wall of each stop piece circumferentially extending so as to be in contact with at least one upstream face of a tooth of the rotor disc, a plurality of stop pieces each disposed in a slot of the disc and configured so that their first walls are circumferentially arranged end to end, about said axis, and a retaining ring attached to the disc and mounted to the entire circumference of the rotor disc against the first walls of the stop pieces so as to hold the stop pieces in position in the disc slots, the method comprising, for each moving blade:

installing one of the stop pieces of the turbomachine rotor assembly against the radially inner end face of the blade root, and installing the moving blade equipped with the stop piece in the slot of the rotor disc.

10. The method according to claim 9, further comprising:

installing a circlip in a groove of the rotor disc, and installing the retaining ring on the disc along the first walls of the stop pieces, the retaining ring being held in position by blocking made by the circlip.

* * * * *